UNITED STATES PATENT OFFICE.

CARL LIESENBERG, OF HALLE-ON-THE-SAALE, GERMANY, ASSIGNOR OF ONE-HALF TO ERNST L. C. SCHULZ, OF NEW YORK, N. Y.

PROCESS OF CLARIFYING LIQUIDS.

SPECIFICATION forming part of Letters Patent No. 450,243, dated April 14, 1891.

Application filed October 6, 1890. Serial No. 367,273. (No specimens.)

*To all whom it may concern:*

Be it known that I, CARL LIESENBERG, a resident of Halle-on-the-Saale, Germany, have invented an Improved Composition for and Process of Clarifying Liquids, of which the following is a specification.

This invention relates to a composition for and process of clarifying liquids.

The former attempts to use solutions of phosphates as the means of clarifying liquids have not led to a process that could be advantageously used, these solutions not being pure enough and containing substances that contaminated the liquids. Inexpensive phosphate solutions mostly contain a large quantity of sulphuric acid and gipsum, which ingredients are of disadvantage to the liquids, respectively to their purity, as gipsum readily dissolves in most liquids, and as sulphuric acid cannot be removed except by using substances of deleterious effect—for instance, baryta. To overcome these difficulties is the purpose of this invention.

The invention mainly consists in clarifying the liquids with a solution of phosphate treated with sulphurous acid. This preparation can be easily and cheaply manufactured, and its ingredients are free from the disadvantage above mentioned, but increase the clarifying effect.

I prepare my clarifying-liquid by treating a phosphate in the presence of water with sulphurous acid. In practice I suspend the phosphates in water and then add the sulphurous acid to the point of saturation In this composition, if, for instance, phosphates containing lime were used, the solution will contain acid phosphate of calcium, acid sulphite of calcium, and free sulphurous acid. The mutual effect of these ingredients on each other can be expressed by the following formula:

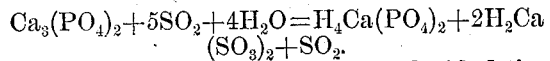

By adding to the liquid to be clarified the solution above mentioned I easily obtain voluminous precipitates readily filtered and even pigments that are conveniently removable. These precipitates are obtained with the aid of the alkaline earths, (contained in the liquid to be clarified,) earths, and metallic oxides—for instance, oxide of iron—the quantities of which can be artificially increased in order to obtain a stronger effect. The acid phosphate is changed into soluble saturated tribasic phosphate, and the acid sulphite, together with the sulphurous acid, is changed into insoluble sulphite of calcium, as may be expressed by the following formula, if we (for instance) assume that in the liquid to be clarified there had been lime:

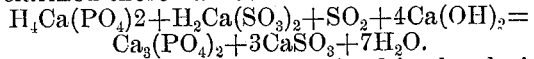

The acid sulphites contained in the clarifying solution and the free sulphurous acid exercise a clarifying effect not only by their precipitating impurities, but also by virtue of their bleaching, disinfecting, and deodorizing power, especially upon organic substances.

As sulphurous acid can be cheaply manufactured, this process can be carried into effect in the most convenient and economical way.

Having described the invention, what I claim is—

The process herein described of clarifying liquids, which process consists in adding to the liquid to be clarified a solution containing phosphate and sulphurous acid, as specified.

CARL LIESENBERG.

Witnesses:
CARL BORNGRAEBER,
HENRY W. DIEDERICH.